(12) United States Patent
Arita et al.

(10) Patent No.: US 9,469,709 B2
(45) Date of Patent: Oct. 18, 2016

(54) PHOTOCURABLE COMPOSITION

(75) Inventors: Nao Arita, Tokyo (JP); Kuniyuki Watanabe, Tokyo (JP); Masayuki Tanaka, Tokyo (JP)

(73) Assignee: Three Bond Fine Chemical Co., Ltd., Sagamihara-shi, Kanagawa (JP)

( * ) Notice: Subject to any disclaimer, the term of this patent is extended or adjusted under 35 U.S.C. 154(b) by 128 days.

(21) Appl. No.: 13/989,717

(22) PCT Filed: Nov. 15, 2011

(86) PCT No.: PCT/JP2011/076308
§ 371 (c)(1),
(2), (4) Date: Jun. 25, 2013

(87) PCT Pub. No.: WO2012/073688
PCT Pub. Date: Jun. 7, 2012

(65) Prior Publication Data
US 2013/0267626 A1 Oct. 10, 2013

(30) Foreign Application Priority Data
Nov. 30, 2010 (JP) ................................. 2010-267189

(51) Int. Cl.
*C08F 120/02* (2006.01)
*C09K 3/10* (2006.01)
*C08F 290/04* (2006.01)
*C08K 5/5419* (2006.01)
*C08F 2/48* (2006.01)

(52) U.S. Cl.
CPC .............. *C08F 120/02* (2013.01); *C08F 2/48* (2013.01); *C08F 290/046* (2013.01); *C08K 5/5419* (2013.01); *C09K 3/10* (2013.01); *C08F 2438/01* (2013.01); *C09K 2003/1062* (2013.01); *C09K 2200/0625* (2013.01)

(58) Field of Classification Search
CPC combination set(s) only.
See application file for complete search history.

(56) References Cited

U.S. PATENT DOCUMENTS

| 4,429,088 A * | 1/1984 | Bachmann .......... C08F 299/024 525/163 |
| 2007/0203296 A1 | 8/2007 | Okada |
| 2009/0025870 A1 | 1/2009 | Tanaka |

FOREIGN PATENT DOCUMENTS

| CN | 102057001 A * | 5/2011 |
| JP | 2000-038404 | 2/2000 |
| JP | 2005-105065 | 4/2005 |
| JP | 2006-274084 | 10/2006 |
| JP | 2007-077182 | 3/2007 |
| WO | 2005/087890 | 9/2005 |
| WO | 2007/004584 | 1/2007 |
| WO | 2009/148182 | 12/2009 |

OTHER PUBLICATIONS

Aerosil R805 product information from EVONIK Industries. Retrieved on Aug. 7, 2015. Retrieved from internet <URL:https://www.aerosil.com/lpa-productfinder/page/productsbytext/detail.html?pid=183>.*
International Search Report for PCT/JP2011/076308, dated Feb. 21, 2012.
International Preliminary Report on Patentability for PCT/JP2011/076308, dated Jun. 13, 2013, and English translation thereof.

* cited by examiner

*Primary Examiner* — Sanza McClendon
(74) *Attorney, Agent, or Firm* — Dickinson Wright PLLC

(57) ABSTRACT

The present invention allows for a photocurable composition which exhibits stable physical characteristics in a heat resistance test and an oil resistance test, and exhibits good debubbling properties and excellent workability. A photocurable composition including components (A) to (C).
component (A): a compound that has a polymer obtained from a (meth)acrylic monomer as a main skeleton, and has at least two (meth)acrylic groups in the molecule
component (B): a (meth)acrylic monomer including a component (b-1) and/or a component (b-2)
component (b-1): a (meth)acrylic monomer having a hydroxyl group in the molecule, in an amount of 0.1 to 50 parts by mass with respect to 100 parts by mass of the component (A), component (b-2): a (meth)acrylic monomer having a saturated alicyclic skeleton in the molecule, in an amount of 0.1 to 10 parts by mass with respect to 100 parts by mass of the component (A), component (C): a photoinitiator.

5 Claims, No Drawings

PHOTOCURABLE COMPOSITION

TECHNICAL FIELD

The present invention relates to a composition which is cured by energy line irradiation, elastic, and excellent in heat resistance and oil resistance.

BACKGROUND ART

Conventionally, Patent Literature 1 reports a polymer which has a main skeleton of a (meth)acrylic monomer, and has an alkenyl group at the terminal. The polymer is known to be excellent in endurance. However, the polymer has a high viscosity, and has a problem with debubbling properties after coating and causes a problem such as stringiness during coating, and thus, for practical use, the polymer fails to achieve an improvement in workability, unless the polymer is diluted with a low-molecular compound.

In addition, a technique is known for curing a polymer having a (meth)acryloyl group by heating or active energy line application with the addition of an initiator which generates radical species, as in Patent Literature 2. The polymer can be cured in a short period of time by, in particular, ultraviolet irradiation. However, when a polymer has a reactive group, the crosslink density is generally low. As a result, if the product is cured, the cured product obtained will undergo a decrease in elasticity, and also have problems such as surface stickiness produced.

On the other hand, the addition of a (meth)acrylic monomer increases the number of cross-linking points, thus strengthening the cured product, and decreasing the surface stickiness. However, as in Patent Literature 3, the excessively increased additive amount of the (meth)acrylic monomer makes the cured product adhesive, thereby resulting in a failure to prepare an elastic cured product. In addition, the addition of the (meth)acrylic monomer has a tendency to decrease the heat resistance, etc. of the cured product, and make the cured product brittle. In order to apply the polymer compound to a sealing agent or a potting agent, the choice and additive amount of the (meth)acrylic monomer are important factors.

CITATION LIST

Patent Literature

Patent Literature 1: Japanese Patent Application Laid-Open No. 2000-038404
Patent Literature 2: Japanese Patent Application Laid-Open No. 2006-274084
Patent Literature 3: Japanese Patent Application Laid-Open No. 2005-105065

SUMMARY OF INVENTION

Technical Problem

Conventionally, any photocurable composition has not been found which exhibits stable physical characteristics in a heat resistance test and an oil resistance test as endurance tests, and exhibits good debubbling properties and excellent workability during coating.

Solution to Problem

The inventors have completed the invention with reference to embodiments described below, as a result of earnest studies in order to achieve the object mentioned above.

The summary of the present invention will be described next. A first embodiment of the present invention is a photocurable composition including components (A) to (C).

Component (A): a compound that has a polymer obtained from a (meth)acrylic monomer as a main skeleton, and has at least two (meth)acrylic groups in the molecule Component (B): a (meth)acrylic monomer including a component (b-1) and/or a component (b-2)

Component (b-1): a (meth)acrylic monomer having a hydroxyl group in the molecule, in an amount of 0.1 to 50 parts by mass with respect to 100 parts by mass of the component (A), Component (b-2): a (meth)acrylic monomer having a saturated alicyclic skeleton in the molecule, in an amount of 0.1 to 10 parts by mass with respect to 100 parts by mass of the component (A), the monomer having a saturated alicyclic skeleton in the molecule Component (C): a photoinitiator A second embodiment of the present invention is the composition according to the first embodiment, which contains, as a component (D), fumed silica that has a surface modified with an alkyl group.

A third embodiment of the present invention is the composition according to the first or second embodiment, in which the (meth)acrylic monomer having a hydroxyl group in the component (b-1) has a structure of formula 1.

A fourth embodiment of the present invention is the composition according to any of the first to third embodiments, in which the saturated alicyclic skeleton in the component (b-2) has an isobornyl skeleton and/or a dicyclopentanyl skeleton.

A fifth embodiment of the present invention is a sealing agent including the composition according to the first to fourth embodiments.

A sixth embodiment of the present invention is an in-car electronic component including the composition according to the first to fourth embodiments or the sealing agent according to the fifth embodiment.

Advantageous Effects of Invention

The present invention allows for a photocurable composition which exhibits stable physical characteristics in a heat resistance test and an oil resistance test, and exhibits good debubbling properties and excellent workability. In addition, the photocurable composition can be preferably used as sealing agents in-car electronic components and the like.

DESCRIPTION OF EMBODIMENTS

Details of the present invention will be described next.

The component (A) for use in the present invention is a compound that has a main skeleton including a polymer obtained from a (meth)acrylic monomer, and has at least two (meth)acrylic groups in the molecule. The (meth)acrylic group herein is a general term for an acrylic group and a methacrylic group. The reactive (meth)acrylic group remaining in the component (A) may be present at any of the side chain and/or terminal of the molecule, but is preferably present at the both terminals of the main chain in terms of rubber elasticity and flexibility.

The (meth)acrylic monomer constituting the main chain of the component (A) is not particularly limited, and various types of (meth)acrylic monomers can be used therefor. The (meth)acrylic monomer is a general term for monomers having an acrylic group or a methacrylic group. Examples of the (meth)acrylic monomer include, but not limited to, (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluoyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-(methacryloyloxypropyl)trimethoxysilane, an ethylene oxide adduct of (meth)acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate, 2-perfluorohexadecylethyl (meth)acrylate, and the like. In the present invention, although these monomers can be selected and used for polymerization, it is preferable to select a (meth)acrylic monomer having a hydrocarbon group.

The number average molecular weight (Mn) of the component (A) preferably has a lower limit of 500, and more preferably 3000, and preferably has an upper limit of 100000, and more preferably 50000. If the number average molecular weight is lower than the lower limit, the cured product will have a tendency to fail to develop elasticity. On the other hand, if the number average molecular weight is higher than the upper limit, there is a possibility that strong viscosity will be developed as a property of the composition to retain difficulty in handling and coating.

While the component (A) can be obtained by various polymerization methods, which are not particularly limited, a radical polymerization method is preferred in terms of general versatility of monomers and ease of reaction control. Among types of radical polymerization, controlled radical polymerization is preferred, living radical polymerization is further preferred, and atom transfer radical polymerization is particularly preferred. In addition, methods for introducing a (meth)acrylic group to the polymer of the (meth)acrylic monomer as a main chain includes: (1) a method through a reaction between a vinyl polymer having a hydroxyl group at the terminal and a (meth)acrylate compound containing chlorine, bromine, or a hydroxyl group; (2) a method through a reaction between a vinyl polymer having a halogen group at the terminal and a (meth)acrylate compound containing an alkali metal ion or a quaternary ammonium ion; (3) a method of reacting a vinyl polymer having a hydroxyl group at the terminal with a diisocyanate compound and reacting the remaining isocyanate group with a (meth)acrylate containing a hydroxyl group, and the like. These methods are already known methods, which are described in Japanese Patent Application Laid-Open No. 61-133201, Japanese Patent Application Laid-Open No. 11-80250, Japanese Patent Application Laid-Open No. 2000-38404, Japanese Patent Application Laid-Open No. 2001-271055, Japanese Patent Application Laid-Open No. 2002-69121, etc.

While the (meth)acrylic monomer as the component (B) according to the present invention refers to the same (meth)acrylic monomer as described above, the (meth)acrylic monomer which can be used as the component (B) according to the present invention is a (meth)acrylic monomer having a hydroxyl group in the molecule as the component (b-1) and/or a (meth)acrylic monomer having a saturated alicyclic skeleton as the component (b-2). As for the additive amounts of these components, the component (b-1) is 0.1 to 50 parts by mass, preferably 0.1 to 30 parts by mass, and further preferably 1 to 20 parts by mass with respect to 100 parts by mass of the component (A). The component (b-2) is preferably 0.1 to 10 parts by mass, and further preferably 5 to 10 parts by mass with respect to 100 parts by mass of the component (A). The larger total additive amount of the component (B) results in a brittle cured product, thereby failing to retain endurance in an endurance test. On the other hand, the smaller total additive amount of the component (B) increases the viscosity to decrease coating properties, and increase the viscosity of the composition to cause the problem of stringiness 1.

Specific examples of the component (b-1) include 2-hydroxyethyl (meth)acrylate, 2-hydroxypropyl (meth)acrylate, 2-hydroxybutyl (meth)acrylate, 2-(meth)acryloyloxyethyl succinate, 2-(meth)acryloyloxyethyl hexahydrophthalate, 2-(meth)acryloyloxyethyl-2-hydroxypropylphthalate, and the like. The component (b-1) is preferably represented by the following general formula 1, and most preferably 2-hydroxypropylmethacrylate and/or 2-hydroxyethylmethacrylate.

[Chemical Formula 1]

Formula 1

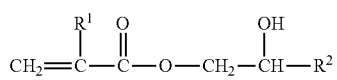

(Wherein, $R^1$ represents hydrogen or a methyl group, and $R^2$ represents a methyl group or an ethyl group.)

Specific examples of the component (b-2) include isobornyl (meth)acrylate, dicyclopentanyl (meth)acrylate, cyclohexyl (meth)acrylate, adamantanyl (meth)acrylate, and the like. The component (b-2) is most preferably a (meth)acrylic monomer having an isobornyl skeleton and/or a dicyclopentanyl skeleton.

The photoinitiator which can be used as the component (C) according to the present invention is intended to generate active radical species by active energy line irradiation such as ultraviolet irradiation, thereby inducing radical polymerization of the component (A) and component (B). Specific examples of the component (C) include, but not limited to, acetophenone, propiophenone, benzophenone, xanthol, fluorene, benzaldehyde, anthraquinone, triphenylamine, carbazole, 3-methylacetophenone, 4-methylacetophenone, 3-pentylacetophenone, 4-methoxyacetophenone, 3-bromoacetophenone, 2,2-diethoxyacetophenone, p-diacetylbenzene, 3-methoxybenzophenone, 2,4,6-trimethylbenzophenone, oligo(2-hydroxy-2-methyl-1-(4-(1-methylvinyl)phenyl)propa none), 4-allylacetophenone, camphor quinone, 2,4,6-trimethylbenzoyldiphenyl phosphine oxide, 4-methylbenzophenone, 4-chloro-4'-benzylbenzophenone, 2-hydroxy-2-methyl-1-phenyl-1-propanone, 3-chloroxanthone, 3,9-dichloroxanthone, 3-chloro-8-nonylxanthone, benzoyl, benzoylmethylether, benzoinbutylether, bis(4-dimethylaminophenyl)ketone, benzylmethoxyketal, 2-chlorothioxanthone, o-methyl benzoate, benzyldimethylketal, methylbenzoylformate, and the like.

The component (C) is preferably added at 0.1 to 10 parts by mass with respect to 100 parts by mass of the component (A). If the component (C) is less than 0.1 parts by mass, there is a tendency to decrease the photocurable property, and if the component (C) is more than 10 parts by mass, there is a tendency to increase the generation of radical species, thereby making the cured product hard.

The component (D) which can be used in the present invention is fumed silica that has a surface modified with an alkyl group. The unmodified fumed silica is hydrophilic due to silanol groups remaining on the surface of the fumed silica, and an approach is known in which the surface is hydrophobized by adding dimethyldichloro silane or the like to the silanol groups. In the present invention, fumed silica is preferred which has a straight-chain alkyl group with two or more carbon atoms added thereto. In addition, the fumed silica is not particularly limited, but preferably has an average primary particle size of 1 to 100 nm. Specific trade names thereof include NKC130 and R805 from Nippon Aerosil Co., Ltd. While there are many types of surface treatment for the fumed silica, the component (D) according to the present invention is suitable, because the fumed silica dispersed in the composition has a tendency to settle out during long-term storage in the treatment with any other than an alkyl group. Furthermore, although the definite reason has not been identified, when the component (D) is used, favorable debubbling properties will be achieved, actually which also depending on the balance with the additive amount of the component (B). If bubbles remain in the cured product, cracking will be caused from the bubbles, thereby resulting in a failure to retain physical characteristics in an endurance test.

The component (D) is preferably added at 0.1 to 10 parts by mass, and more preferably 0.1 to 5.0 parts by mass with respect to 100 parts by mass of the component (A). If the component (D) is less than 0.1 parts by mass, the viscosity will be excessively decreased, actually which also depending on the balance with the additive amount of the component (B), thereby resulting in flowing. On the other hand, if the component (D) is more than 5.0 parts by mass, there will be a tendency to decrease the debubbling properties, actually which also depending on the balance with the additive amount of the component (B).

In order to cure the shaded section irradiated with no light, an organic peroxide may be added to the curable composition according to the present invention to provide the property of being curable by heating. Specific examples of the organic peroxide include, but not limited to, ketone peroxides such as methylethylketone peroxide, cyclohexanone peroxide, 3,3,5-trimethylcyclohexanone peroxide, methylcyclohexanone peroxide, methyl acetoacetate peroxide, acetylacetone peroxide, and the like; peroxyketals such as 1,1-bis(t-butylperoxy)-3,3,5-trimethylcyclohexane, 1,1-bis(t-butylperoxy)cyclohexane, 2,2-bis(t-butylperoxy)octane, n-butyl-4,4-bis(t-butylperoxy)valerate, 2,2-bis(t-butylperoxy)butane, and the like; hydroperoxides such as t-butyl hydroperoxide, cumene hydroperoxide, diisopropylbenzene hydroperoxide, p-menthane hydroperoxide, 2,5-dimethylhexane-2,5-dihydroperoxide, 1,1,3,3-tetramethylbutyl hydroperoxide, and the like; dialkyl peroxides such as di-t-butyl peroxide, t-butylcumyl peroxide, dicumyl peroxide, α,α'-bis(t-butylperoxy m-isopropyl)benzene, 2,5-dimethyl-2,5-di(t-butylperoxy)hexane, 2,5-dimethyl-2,5-di(t-butylperoxy)hexyne-3, and the like; diacyl peroxides such as acetyl peroxide, isobutyryl peroxide, octanoyl peroxide, decanoyl peroxide, lauroyl peroxide, 3,5,5-trimethyl hexanoyl peroxide, succinic acid peroxide, benzoyl peroxide, 2,4-dichlorobenzoyl peroxide, m-toluoyl peroxide, and the like; peroxydicarbonates such as diisopropyl peroxydicarbonate, di-2-ethylhexyl peroxydicarbonate, di-n-propyl peroxydicarbonate, bis-(4-t-butylcyclohexyl)peroxydicarbonate, dimyristyl peroxydicarbonate, di-2-ethoxyethyl peroxydicarbonate, dimethoxyisopropyl peroxydicarbonate, di(3-methyl-3-methoxybutyl)peroxydicarbonate, diallyl peroxydicarbonate, and the like; peroxyesters such as t-butyl peroxyacetate, t-butyl peroxyisobutylate, t-butyl peroxypivalate, t-butyl peroxyneodecanoate, cumyl peroxyneodecanoate, t-butylperoxy-2-ethylhexanoate, t-butylperoxy-3,5,5-trimethylhexanoate, t-butyl peroxylaurate, t-butyl peroxybenzoate, di-t-butyl peroxy isophthalate, 2,5-dimethyl-2,5-di(benzoylperoxy)hexane, t-butyl peroxymaleic acid, t-butyl peroxyisopropylcarbonate, cumyl peroxyoctoate, t-hexyl peroxyneodecanoate, t-hexyl peroxypivalate, t-butyl peroxyneohexanoate, t-hexyl peroxyneohexanoate, cumyl peroxyneohexanoate, and the like; and acetyl cyclohexyl sulfonyl peroxide, t-butyl peroxyallylcarbonate.

The curable composition according to the present invention may be blended with various types of additives, for example, anti-aging agents, plasticizers, property adjusters, solvents, etc., in order to adjust the properties. The (meth) acrylic polymer is intrinsically a polymer which is excellent in heat resistance, weatherability, and endurance, and thus does not always require any anti-aging agents, for which conventionally known antioxidants and light stabilizers can be used appropriately. In addition, the anti-aging agents can be also used for polymerization control during polymerization, and thus also for property control.

Various types of antioxidants are known, which include thioether, phosphorous, hindered phenol, monoacrylate-phenol, nitroxide antioxidants, and the like. Above all, hindered phenol compounds are preferred as mentioned below.

Specific examples of thioether antioxidants include MARK PEP-36 MARK A023 (all from Adeka Argus Chemical), and the like.

Specific examples of phosphorous antioxidants include Irgafos 38, Irgafos 168, Irgafos P-EPQ (all from Nihon Ciba-Geigy K.K.), and the like.

Examples of hindered phenol compounds specifically include the following compounds: 2,6-di-t-butyl-4-methylphenol, 2,6-di-t-butyl-4-ethylphenol, mono(or di or tri)(α-methylbenzyl)phenol, 2,2'-methylenebis(4-ethyl-6-t-butylphenol), 2,2'-methylenebis(4-methyl-6-t-butylphenol), 4,4'-butylidenebis(3-methyl-6-t-butylphenol), 4,4'-thiobis(3-methyl-6-t-butylphenol), 2,5-di-t-butylhydroquinone, 2,5-di-t-amylhydroquinone, triethylene glycol-bis-[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl-tetrakis[3-(3,5-di-t-butyl-4-hydroxyphenyl)propionate], 2,2-thio-diethylenebis[3-(3,5-di-t-butyl-4-hydroxyphenyl)propionate], octadecyl-3-(3,5-di-t-butyl-4-hydroxyphenyl)propionate, N,N'-hexamethylenebis(3,5-di-t-butyl-4-hydroxy-hydrocinnamamide), 3,5-di-t-butyl-4-hydroxy-benzylphosphonate-diethylester, 1,3,5-trimethyl-2,4,6-tris (3,5-di-t-butyl-4-hydroxybenzyl)benzene, bis(3,5-di-t-butyl-4-hydroxybenzylphosphonic acid ethyl)calcium, tris-(3,5-di-t-butyl-4-hydroxybenzyl)isocyanurate, 2,4-2,4-bis [(octylthio)methyl]o-cresol, N,N'-bis[3-(3,5-di-t-butyl-4-hydroxyphenyl)propionyl]hydrazine, tris(2,4-di-t-butylphenyl)phosphite, 2-(5-methyl-2-hydroxyphenyl) benzotriazole, 2-[2-hydroxy-3,5-bis(α,α-dimethylbenzyl) phenyl]-2H-benzo triazole, 2-(3,5-di-t-butyl-2-hydroxyphenyl)benzotriazole, 2-(3-t-butyl-5-methyl-2-hydroxyphenyl)-5-chlorobenzotriazole, 2-(3,5-di-t-butyl-2-hydroxyphenyl)-5-chlorobenzotriazole, 2-(3,5-di-t-amyl-2-hydroxyphenyl)benzotriazole, 2-(2'-hydroxy-5'-t-octylphenyl)-benzotriazole, condensation products with methyl-3-[3-t-butyl-5-(2H-benzotriazole-2-yl)-4-hydroxy-phenyl]propionate-polyethylene glycol (molecular weight: about 300), hydroxyphenyl benzotriazole derivatives, 2-(3,5-di-t-butyl-4-hydroxybenzyl)-2-n-butylmalonic acid bis(1,2,2,6,6-pentamethyl-4-piperidyl), 2,4-di-t-butylphenyl-3,5-di-t-butyl-4-hydroxybenzoate, and the like. Examples of trade names can include, but not limited thereto, NOCRAC 200, NOCRAC M-17, NOCRAC SP, NOCRAC SP-N, NOCRAC NS-5, NOCRAC NS-6, NOCRAC NS-30, NOCRAC 300, NOCRAC NS-7, and NOCRAC DAH (all from Ouchi Shinko Chemical Co., Ltd.); MARK AO-30, MARK AO-40, MARK AO-50, MARK AO-60, MARK AO-616, MARK AO-635, MARK AO-658, MARK AO-80, MARK AO-15, MARK AO-18, MARK 328, and MARK AO-37 (all from Adeka Argus Chemical); IRGANOX-245, IRGANOX-259, IRGANOX-565, IRGANOX-1010, IRGANOX-1024, IRGANOX-1035, IRGANOX-1076, IRGANOX-1081, IRGANOX-1098, IRGANOX-1222, IRGANOX-1330, and IRGANOX-1425WL (all from Nihon Ciba-Geigy K.K.); Sumilizer GA-80 (from Sumitomo Chemical Company, Limited), and the like.

Examples of monoacrylate-phenol antioxidants include 2-t-butyl-6-(3t-butyl-2-hydroxy-5-methylbenzyl)-4-methyl phenylacrylate (trade name: Sumilizer GM) 2,4-di-t-amyl-6-[1-(3,5-di-t-amyl-2-hydroxyphenyl)ethyl]phenylacrylate (trade name: Sumilizer GS), and the like.

Examples of nitroxide antioxidants include nitroxy free radicals from cyclic hydroxyamines, such as 2,2,6,6-substituted-1-piperidinyl oxyradicals and 2,2,5,5-substituted-1-pyrrolidinyl oxyradicals, and the like. Alkyl groups having four or less carbon atoms such as a methyl group and an ethyl group are appropriate as substituents. Specific nitroxy free radical compounds include, but not limited to, 2,2,6,6-tetramethyl-1-piperidinyl oxyradical (TEMPO), 2,2,6,6-tetraethyl-1-piperidinyl oxyradical, 2,2,6,6-tetramethyl-4-oxo-1-piperidinyl oxyradical, 2,2,5,5-tetramethyl-1-pyrrolidinyl oxyradical, 1,1,3,3-tetramethyl-2-isoindolinyl oxyradical, N,N-di-t-butylamine oxyradical, and the like. Instead of the nitroxy free radicals, stable free radicals such as galvinoxyl free radicals may be used.

In addition, the antioxidants may be used in combination with light stabilizers. Specific examples of the light stabilizers include bis(1,2,2,6,6-pentamethyl-4-piperidyl)sebacate (trade name: Sanol), and the like. The combination use is particularly preferable, because the effect may be further produced to improve, in particular, the heat resistance. It is to be noted that TINUVIN C353, TINUVIN B75 (all from Nihon Ciba-Geigy K.K.), and the like may be used in which an antioxidant and a light stabilizer are mixed in advance.

The photocurable composition according to the present invention has a favorable handling property, and can be preferably used as a sealing agent, because the composition can be applied to a sealing section, a potting section, and the like, and then cured by active energy line irradiation such as ultraviolet or visible light irradiation. In addition, the composition according to the present invention has heat resistance and oil resistance, and can be thus used even for components always exposed to high temperatures and oil scattering, among in-car electronic components. Specific examples of in-car electronic components which require severe endurance include oil pressure switches, air flow meters, cam position sensors, water temperature sensors, crank position sensors, inlet air temperature sensors, speed sensors, and the like. Alternatively, the composition can be used for in-car electronic substrates which require potting and assembly of in-car electrical and electronic components. Specific examples of the electronic substrates include electronic substrates such as engine control units, throttle control units, exhaust gas recirculation control units, and the like.

EXAMPLES

While the present invention will be described next in further details with reference to examples, the present invention is not to be considered limited to only these examples. (Hereinafter, the photocurable composition is simply referred to as the composition)

Production Example 1

Produced as follows was a compound including a polymer obtained from a (meth)acrylic monomer as a main skeleton and having at least two (meth)acrylic groups in the molecule.

The polymerization of an n-butyl acrylate with copper (I) bromide as a catalyst, pentamethyldiethylenetriamine as a ligand, and diethyl-2,5-dibromoadipate as an initiator was carried out to obtain crude poly(n-butyl acrylate) with a terminal bromine group, which had a number average molecular weight of 25200 and molecular weight distribution of 1.20. In N,N-dimethylacetoamide (300 mL), 300 g of this polymer was dissolved with the addition of 5.3 g of potassium acrylate, and stirred while heating at 70° C. for 3 hours under a nitrogen atmosphere to obtain poly(n-butyl acrylate) with acryloyl groups at both terminals (hereinafter, referred to as a polymer 1). After distilling away the N,N-dimethylacetoamide in the mixed solution under reduced pressure, toluene was added to the residue, and the insoluble matter was removed by filtration. The toluene in the filtrate was distilled away under reduced pressure to purify the polymer 1. The purified polymer 1 was 27100 in number average molecular weight, 1.31 in molecular weight distribution, and 2.0 in the average number of terminal acryloyl groups (that is, 100% in the ratio of acryloyl groups introduced to terminals).

The "number average molecular weight" and the "molecular weight distribution (the ratio between weight average molecular weight and number average molecular weight)" were calculated in terms of standard polystyrene equivalent by using gel permeation chromatography (GPC). Two columns (shodex GPC K-802.5; from Showa Denko K.K.) (shodex GPCK-804; from Showa Denko K.K.) filled with a polystyrene cross-linked gel were connected in series and used as GPC columns, and chloroform was used as a GPC solvent. In addition, "the average number of terminal acryloyl groups" refers to "the average number of acryloyl groups introduced to terminals per molecule of the polymer", which was calculated from the number average molecular weight obtained by 1H-NMR analysis and GPC.

In order to prepare the composition, the following components were prepared.

Component (A): a compound that has a polymer obtained from a (meth)acrylic monomer as a main skeleton, and has at least two (meth)acrylic groups in the molecule Polymer 1 obtained in Production Example 1

Component (B): a (meth)acrylic monomer including a component (b-1) and/or a component (b-2)

Component (b-1): (meth)acrylic monomer having a hydroxyl group in the molecule

Monomer 1: 2-hydroxyethyl methacrylate

Monomer 2: 2-hydroxypropyl methacrylate

Component (b-2): a (meth)acrylic monomer having a saturated alicyclic skeleton in the molecule Monomer 3: isobornyl acrylate Monomer 4: dicyclopentanyl acrylate Component (B'): (meth)acrylic monomer other than the component (B)
Monomer 1': lauryl acrylate
Monomer 2': trimethylol propane trimethacrylate
Component (C): a photoinitiator
Photoinitiator 1: 1:2 (mass ratio) mixture of benzophenone and 2-hydroxy-2-methyl-1-phenyl-propane-1-on
Component (D): fumed silica that has a surface modified with an alkyl group
Silica 1: fumed silica with an octylsilane group added thereto (average primary particle size: 12 nm, specific surface area: 200 m²/g) (Aerosil R805 from Nippon Aerosil Co., Ltd.)
Component (D'): fumed silica other than the component (D)
Silica 1': fumed silica with a polydimethylsiloxane group added thereto (average primary particle size: 12 nm, specific surface area: 200 m²/g) (Aerosil RY200 from Nippon Aerosil Co., Ltd.)
Silica 2': fumed silica modified with a dimethylsiloxane group (average primary particle size: 12 nm, specific surface area: 200 m²/g) (Aerosil R974 from Nippon Aerosil Co., Ltd.)

The composition is prepared as follows. The component (A) and the component (D) are added, stirred with a stirrer for 30 to 60 minutes, and then further stirred for on the order of 30 minutes with the addition of the component (B). After stirring for 15 minutes with the addition of the component (C), defoaming is carried out, and filtration is carried out through a mesh to fill a container. The detailed amounts of preparation comply with Table 1, where the numerical values are all listed in terms of parts by mass.

TABLE 1

| Component | Name of Raw Material | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (A) | Production Example 1 | 100 | 100 | 100 | 100 | 100 | 100 | 100 | 100 | 100 | 100 |
| Component (b-1) | Monomer 1 | 15 | | 50 | 8 | | | 15 | 15 | | |
| | Monomer 2 | | 15 | | | | | | | 15 | 15 |
| Component (b-2) | Monomer 3 | | | | | 8 | | 8 | | 8 | |
| | Monomer 4 | | | | | | 8 | | 8 | | 8 |
| Component (B') | Monomer 1' | | | | | | | | | | |
| | Monomer 2' | | | | | | | | | | |
| Component (C) | Photo-initiator | 3 | 3 | 3 | 3 | 3 | 3 | 3 | 3 | 3 | 3 |
| Component (D) | Silica 1 | 3 | 3 | 3 | 3 | 3 | 3 | 3 | 3 | 3 | 3 |
| Component (D') | Silica 1' | | | | | | | | | | |
| | Silica 2' | | | | | | | | | | |
| | Total | 121 | 121 | 156 | 114 | 114 | 114 | 129 | 129 | 129 | 129 |

| Component | Name of Raw Material | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Component (A) | Production Example 1 | 100 | 100 | 100 | 100 | 100 | 100 | 100 |
| Component (b-1) | Monomer 1 | | 100 | | | | 8 | 8 |
| | Monomer 2 | | | | | | | |
| Component (b-2) | Monomer 3 | | | 100 | 50 | 20 | 15 | |
| | Monomer 4 | | | | | | | 15 |
| Component (B') | Monomer 1' | | | | | | | |
| | Monomer 2' | | | | | | | |
| Component (C) | Photo-initiator | 3 | 3 | 3 | 3 | 3 | 3 | 3 |
| Component (D) | Silica 1 | 3 | 3 | 3 | 3 | 3 | 3 | 3 |
| Component (D') | Silica 1' | | | | | | | |
| | Silica 2' | | | | | | | |
| | Total | 106 | 206 | 206 | 156 | 126 | 129 | 129 |

| Component | Name of Raw Material | Comparative Example 8 | Comparative Example 9 | Comparative Example 10 | Comparative Example 11 | Comparative Example 12 | Comparative Example 13 |
|---|---|---|---|---|---|---|---|
| Component (A) | Production Example 1 | 100 | 100 | 100 | 100 | 100 | 100 |
| Component (b-1) | Monomer 1 | | | 15 | 15 | | |
| | Monomer 2 | 8 | 8 | | | | |
| Component (b-2) | Monomer 3 | 15 | | | | | |
| | Monomer 4 | | 15 | | | | |
| Component (B') | Monomer 1' | | | | | 15 | |
| | Monomer 2' | | | | | | 15 |
| Component (C) | Photo-initiator | 3 | 3 | 3 | 3 | 3 | 3 |

TABLE 1-continued

|  |  |  |  |  |  |  |  |
|---|---|---|---|---|---|---|---|
| Component (D) | Silica 1 | 3 | 3 |  |  | 3 | 3 |
| Component (D') | Silica 1' |  |  | 3 |  |  |  |
|  | Silica 2' |  |  |  | 3 |  |  |
|  | Total | 129 | 129 | 121 | 121 | 121 | 121 |

For uncured Examples 1 to 10 and Comparative Examples 1 to 13, the viscosity and debubbling properties were checked as properties, and for the examples and comparative examples as cured products, the hardness, tensile shear bond strength, elongation percentage, and glass transition temperature (DMA) were measured as physical characteristics. In addition, a heat resistance verification test and an oil resistance verification test were carried out as endurance tests. The initial measurement results and the change rates of the physical characteristics after the endurance tests are listed in Table 2.

[Viscosity Measurement]

A cone-plate type rotational viscometer is used which is adjusted to 25° C. with the use of a circulation high-temperature bath. The composition was sampled for 0.5 cc, and discharged into the center of a sample cup. The sample cup was attached to the main body to make a measurement for 3 minutes. The measurement result is regarded as "viscosity (Pa·s)". The viscosity preferably is within the range of 10 to 40 Pa·s, and if the viscosity is lower than 10 Pa·s, the composition has a tendency to flow excessively, and if the viscosity is higher than 40 Pa·s, the coating property of the composition is decreased to cause the problem of stringiness.

[Debubbling Check]

After intentionally mixing bubbles into the composition, a glass container of 12 cc is filled with 10 cc of the composition. Then, the glass container is left for on the order of 12 hours in a constant-temperature bath which has an atmosphere at 40° C., and the debubbling property is determined on a scale of one to three. The criteria for determination are as follows, and the results are regarded as "debubbling properties". The debubbling properties are preferably ○ or Δ.

○: no bubbles left
Δ: some bubbles left
x: no bubbles removed

[Hardness (Shore A)]

The composition set to 6 mm in thickness is irradiated at 45 kJ/m² by an ultraviolet irradiator to create a sheet-like cured product. While keeping the pressurization surface of an A-type durometer (hardness meter) parallel to the sheet-like cured product, the pressurization surface and the sample are closely attached to each other by prompt pressing with a force of 10 N without any shocks. The maximum value is read at the time of measurement, and the maximum value is regarded as "hardness (no unit)". The details comply with the JIS K 6253. The hardness is preferably less than 50, because the lower hardness can follow volume expansion and contraction in high-temperature atmospheres.

[Measurement of Tensile Shear Bond Strength]

The composition is applied to iron (JIS, G, 3141 SPCC, SD), and then attached to glass (JIS, R, 3202) with an area 25 mm×10 mm. An ultraviolet irradiator is used for irradiation at 45 kJ/m² to create a test piece. The test piece is fixed at both ends to a chuck so that the long axis of the test piece is aligned with the center of the chuck. The test piece is pulled at a tension rate of 50 mm/min to measure the maximum load. The strength at the maximum load is regarded as "shear bond strength (MPa)". The details comply with the JIS K 6850. The shear bond strength is preferably 1.0 MPa or more.

[Measurement of Elongation Percentage]

The composition set to 2 mm in thickness is irradiated at 45 kJ/m² to create a sheet-like cured product. The product is subjected to punching with a dumbbell No. 3 to prepare a test piece, and gauge lines are written on the test piece at intervals of 10 mm. The test piece is fixed to a chuck in the same manner as for the measurement of the tensile shear strength, and pulled at a tension rate of 500 mm/min until the test piece is cut. The test pieces is elongated to increase the intervals between the gauge lines at the time of measurement, and the intervals between the gauge lines are thus measured with a vernier caliper until the test piece is cut. The rate of elongation is regarded as "elongation percentage (%)" on the basis of the initial interval between the gauge lines. In order to follow expansion and contraction, the elongation percentage is preferably 100% or higher.

[Measurement of Glass Transition Temperature]

The composition set to 1 mm in thickness is irradiated at 45 kJ/m² to create a sheet-like cured product. The product is subjected to punching into a width of 10 mm to prepare a test piece. The test piece is attached to a DMA (dynamic viscoelastic measurement) system to measure the storage elastic modulus, loss elastic modulus, and tan δ. The temperature at which the loss elastic modulus reaches a maximum value is regarded as "glass transition temperature (° C.)".

[Heat Resistance verification Test]

Some of the test pieces for the measurements of the hardness, shear bond strength, elongation percentage, and glass transition temperature, which are created for the initial measurements, are left for 100 hours in a hot-air drying furnace set in an atmosphere at 150° C. The test pieces are removed, and left until reaching room temperature, and the measurements are then made to calculate the "rate of change (%)" between at the initial and after leaving at 150° C. for the respective characteristics in accordance with the mathematical formula 1. The rate of change (%) of glass transition temperature preferably is within ±10%, whereas the other rate of change (%) preferably is within ±50% for the other test items.

[Mathematical Formula 1]

$$\text{Rate of Change (\%)} = \frac{\text{Measurement Value after Endurance Test} - \text{Initial Measurement Value}}{\text{Initial Measurement Value}} \times 100$$

[Oil Resistance verification Test]

Some of the test pieces for the measurements of the hardness, shear bond strength, and elongation percentage, which are created for the initial measurements, are put in a pressure-tight container along with oil. The pressure-tight container is left for 100 hours in a hot-air drying furnace set in an atmosphere at 150° C. After the pressure-tight container is removed and left until reaching room temperature, the test pieces are removed, and the oil is wiped off. Thereafter, the measurements are then made to calculate the "rate of change (%)" between at the initial and after leaving at 150° C. for the respective characteristics in accordance with the formula 1. The rate of change (%) preferably is within ±50% for each test item.

TABLE 2

| | Test Item | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Initial | Viscosity | 30 | 29 | 12 | 34 | 36 | 37 | 19 | 20 | 20 | 21 |
| | Debubbling Properties | ○ | ○ | ○ | Δ | Δ | Δ | ○ | ○ | ○ | ○ |
| | Hardness | 33 | 38 | 45 | 32 | 28 | 32 | 29 | 36 | 31 | 40 |
| | Shear Bond Strength | 2.7 | 2.9 | 4.6 | 2.7 | 1.1 | 1.2 | 2.5 | 2.6 | 2.7 | 3.2 |
| | Elongation Percentage | 185 | 167 | 117 | 174 | 141 | 121 | 212 | 189 | 194 | 178 |
| Heat Resistance verification Test | Rate of Change of Hardness | 15 | 18 | 12 | 16 | −11 | −6 | 48 | 17 | 48 | 25 |
| | Rate of Change of Shear Bond Strength | −15 | −21 | 2 | −5 | −11 | −18 | 1 | −9 | −13 | −17 |
| | Rate of Change of Elongation Percentage | −19 | −40 | −15 | −25 | 3 | 0 | −41 | −23 | −48 | −35 |
| | Rate of Change of Glass Transition Temperature | −4 | −5 | −3 | 0 | −7 | −5 | −7 | 4 | −8 | 0 |
| Oil Resistance verification Test | Rate of Change of Hardness | −3 | 0 | 8 | −9 | −32 | −41 | 3 | −11 | 19 | 5 |
| | Rate of Change of Shear Bond Strength | 5 | 7 | 29 | 8 | −35 | −23 | 20 | 8 | 19 | −2 |
| | Rate of Change of Elongation Percentage | −8 | −16 | −2 | −8 | 6 | 0 | −17 | −18 | −30 | −19 |

| | Test Item | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Initial | Viscosity | 31 | 7 | 7 | 13 | 20 | 20 | 21 |
| | Debubbling Properties | X | ○ | ○ | ○ | ○ | ○ | ○ |
| | Hardness | 33 | 35 | 79 | 56 | 27 | 22 | 27 |
| | Shear Bond Strength | 0.7 | 3.3 | 12.0 | 5.9 | 1.1 | 1.4 | 1.8 |
| | Elongation Percentage | 100 | 55 | 185 | 175 | 165 | 213 | 212 |
| Heat Resistance verification Test | Rate of Change of Hardness | −12 | 71 | −10 | −14 | −4 | 105 | 37 |
| | Rate of Change of Shear Bond Strength | −3 | −43 | −12 | −30 | −25 | 42 | −3 |
| | Rate of Change of Elongation Percentage | 20 | −9 | −2 | −6 | −12 | −62 | −50 |
| | Rate of Change of Glass Transition Temperature | −10 | −3 | −13 | −13 | −8 | −7 | −11 |

TABLE 2-continued

|  |  |  | | | | | | |
|---|---|---|---|---|---|---|---|---|
| Oil Resistance verification Test | Rate of Change of Hardness | −52 | 63 | −95 | −75 | −52 | −9 | −19 |
|  | Rate of Change of Shear Bond Strength | −33 | −56 | −96 | −89 | −50 | 3 | −9 |
|  | Rate of Change of Elongation Percentage | 50 | 9 | 16 | 14 | 6 | 0 | −15 |

|  | Test Item | Comparative Example 8 | Comparative Example 9 | Comparative Example 10 | Comparative Example 11 | Comparative Example 12 | Comparative Example 13 |
|---|---|---|---|---|---|---|---|
| Initial | Viscosity | 20 | 21 | 33 | 28 | 32 | 85 |
|  | Debubbling Properties | ○ | ○ | X | X | Δ | X |
|  | Hardness | 24 | 29 | 33 | 32 | 26 | 70 |
|  | Shear Bond Strength | 1.8 | 1.9 | 2.4 | 2.5 | 0.6 | 3.1 |
|  | Elongation Percentage | 221 | 205 | 175 | 180 | 95 | 45 |
| Heat Resistance verification Test | Rate of Change of Hardness | 96 | 48 | 15 | 16 | −82 | 90 |
|  | Rate of Change of Shear Bond Strength | 16 | −5 | −14 | −15 | −52 | 45 |
|  | Rate of Change of Elongation Percentage | −68 | −51 | −19 | −21 | −39 | −70 |
|  | Rate of Change of Glass Transition Temperature | −2 | 0 | −4 | −7 | −5 | −18 |
| Oil Resistance verification Test | Rate of Change of Hardness | 4 | 0 | −3 | −3 | −92 | −70 |
|  | Rate of Change of Shear Bond Strength | 6 | 9 | 8 | 5 | −85 | −90 |
|  | Rate of Change of Elongation Percentage | −30 | −24 | −9 | −8 | −19 | 10 |

From the test results for each item in Table 2, many of the comparative examples fail to achieve both of heat resistance and oil resistance. The rate of change is higher after the oil resistance test in Comparative Example 2 with the additive amount of the component (b-1) greater than 50 parts by mass and Comparative Examples 3 to 5 with the additive amount of the component (b-2) greater than 10 parts by mass. On the other hand, in Comparative Examples 6 to 9 with the component (b-1) mixed with the component (b-2), the component (b-1) is less than 50 parts by mass, whereas the component (b-2) is greater than 10 parts by mass, and the rate of change is thus higher after the heat resistance test while the rate of change is within preferred ranges after the oil resistance test. As compared with these results, the rate of change is kept less than 50% after the heat resistance and oil resistance tests in all of the examples. In addition, when a comparison is made between all of the examples and Comparative Examples 10 and 11 containing no component (D), Comparative Examples 10 and 11 achieve the result of poor debubbling properties, whereas all of the examples achieve the result of favorable debubbling properties. Accordingly, the cured product according to the present invention is less likely to have bubbles left, and less likely to cause cracks in the endurance tests.

INDUSTRIAL APPLICABILITY

The photocurable composition according to the present invention is cured in a short period of time even as compared with curing by heating and moisture curing as other curing modes, thus leading to a reduction in line tact, and improving the efficiency of manufacturing components, substrates, etc. In addition, while soft cured products generally have physical characteristics severely deteriorated after endurance tests, the present invention can retain physical characteristics stably because the physical characteristics are less likely to be changed even in the case of heat resistance in an atmosphere at 150° C. and oil resistance in an atmosphere at 150° C. The present invention can retain, in particular, elasticity, and thus follow expansion and contraction due to temperature change, thereby making peeling from adherend and the like less likely to be caused. The photocurable composition according to the present invention, which has the characteristics, can be used preferably as a sealing agent.

In addition, the composition can be used not only in electrical fields, but also for in-car electrical and electronic components in automotive fields. In particular, in-car electronic components use electronic components for parts in contact with oil such as engine oil in some cases, and the composition according to the present invention, which also has oil resistance, is thus useful in the field.

The invention claimed is:

1. A photocurable composition comprising components (A) to (D),
    component (A): a compound comprising a polymer obtained from a (meth)acrylic monomer as a main skeleton, and having at least two (meth)acrylic groups in a molecule;
    component (B): a (meth)acrylic monomer comprising a component (b-1) and a component (b-2);
        component (b-1): a (meth)acrylic monomer having a hydroxyl group in a molecule, in an amount of 0.1 to 50 parts by mass with respect to 100 parts by mass of the component (A), wherein the (meth)acrylic monomer having a hydroxyl group in the component (b1) is at least one selected from the group consisting of 2-hydroxyethyl (meth)acrylate and 2-hydroxypropyl (meth)acrylate;
        component (b-2): a (meth)acrylic monomer having a saturated alicyclic skeleton in a molecule, in an amount of 0.1 to 10 parts by mass with respect to 100 parts by mass of the component (A);
    component (C): a photoinitiator; and
    component (D): fumed silica having a surface modified with a straight-chain alkyl group with two or more carbon atoms added thereto.

2. The composition according to claim 1, wherein the saturated alicyclic skeleton in the component (b-2) has an isobornyl skeleton and/or a dicyclopentanyl skeleton.

3. A sealing agent comprising the composition set forth in claim 1.

4. An in-car electronic component comprising the composition set forth in claim 1.

5. An in-car electronic component comprising the sealing agent set forth in claim 3.

* * * * *